United States Patent [19]
Huberman et al.

[11] Patent Number: 6,085,216
[45] Date of Patent: Jul. 4, 2000

[54] METHOD AND SYSTEM FOR EFFICIENTLY ALLOCATING RESOURCES FOR SOLVING COMPUTATIONALLY HARD PROBLEMS

[75] Inventors: Bernardo A. Huberman, Palo Alto; Rajan Lukose, Stanford, both of Calif.

[73] Assignee: Xerox Corporation, Stamford, Conn.

[21] Appl. No.: 09/002,021

[22] Filed: Dec. 31, 1997

[51] Int. Cl.$^7$ ...................................................... G06F 9/00
[52] U.S. Cl. ........................................... 709/104; 709/102
[58] Field of Search ..................................... 709/100, 102, 709/103, 104, 105, 108

[56] References Cited

U.S. PATENT DOCUMENTS

| | | | |
|---|---|---|---|
| 5,148,365 | 9/1992 | Dembo | 705/36 |
| 5,235,508 | 8/1993 | Lirov et al. | 364/468.05 |
| 5,404,516 | 4/1995 | Georgiades et al. | 709/104 |
| 5,406,476 | 4/1995 | Deziel, Jr. et al. | 705/8 |
| 5,799,287 | 8/1998 | Dembo | 705/36 |
| 5,872,918 | 2/1999 | Malomsoky et al. | 709/220 |

OTHER PUBLICATIONS

"Hedging Bets on Hard Problems", by Charles Seife, Science, vol. 275, p. 33, Jan. 3, 1997.

"An Economics Approach to Hard Computational Problems", Benardo A. Huberman et al., Science, vol. 275, pp. 51–54, Jan. 3, 1997.

Physical Mapping of Chromosomes "Physical Mapping of chromosomes Using Unique Probes" Faird Alizadeh et al., Chapter 54, pp. 489–500.

"Random Competition: A Simple, but Efficient Method for Parallelizing Inference Systems", Wolfgang Ertel, *Parallelization in Inference Systems*, B. Fronhofer et al., Eds. pp. 195–207, 1992.

"Minimizing conflicts: a heuristic repair method for constraint satisfaction and scheduling problems", Steven Minton et al. Artificial Intelligence, vol. 58, pp. 161–205 (1992).

"A New Method for Solving Hard Satisfiability Problems", Problem Solving: Constraint Satisfaction, Selman et al. pp. 440–446.

"Phase transitions and the search problem", Hogg et al. Artificial Intelligence vol. 81, (1996), pp. 1–15.

"Critical Behavior in the Satisfiability of Random Boolean Expressions," Scott Kirkpatrick et al. Science vol. 264, pp. 1297–1301 (May 27, 1994).

(List continued on next page.)

*Primary Examiner*—Majid A. Banankhah
*Attorney, Agent, or Firm*—Oliff & Berridge, PLC

[57] ABSTRACT

A resource allocation method and system allocates a computational resource between elements of a portfolio of computational entities. The computational resource can be processing time, memory or display screen space. The computational resource can also be associated with a distributed network such as the Internet. In this case, the computational resource is the number of pending messages sent across the distributed network, pendancy time of a message sent across the distributed network, priority of the messages sent across the distributed network, and/or cost of the messages set across the distributed network. When the computational resource is processing time, the resource is allocated between different processes executing on the processor. These different processes include different solution procedures for solving a computationally hard problem, different instances of a single solution procedure for solving the computationally hard problem, and the like. The resource is allocated to optimize the solution time or variance in the solution time. When the computational resource is memory, the resource is allocated between files that are to be stored in the memory, where the total size of the files exceeds the available space in the memory. The available space in the memory is allocated to maximize the likelihood that a file will be stored in the memory when it is needed. When the computational resource is screen real estate, the resource is allocated between display icons that are to be displayed on the display screen, where the total area consumed by the icons exceeds the available screen real estate.

24 Claims, 9 Drawing Sheets

OTHER PUBLICATIONS

"Expected Gains from Parallelizing Constraint Solving for Hard Problems" Tad Hogg et al., Proceedings of the 12$^{th}$ National Conference on Artificial Intelligence, pp. 331–336, 1994.

"Cooperative Solution of Constraint Satisfaction Problems", Scott H. Clearwater et al., Science, vol. 254, pp. 1181–1183 (Nov. 22, 1991).

"Go With the Winners" Algorithms, David Aldous et al., Proceedings of the 35th Symposium on the Foundations of Computer Science, 1994, pp. 492–501.

"How to Use Expert Advice" Nicolo Cesa–Bianchi et al., Proceedings of the 25$^{th}$ Annual ACM Symposium on the Theory of Computing, (1993) pp. 382–391.

"Solving the Really Hard Problems with Cooperative Search", Tad Hogg et al., Proceedings of the 11$^{th}$ National Conference on Artificial Intelligence, 1993, pp. 231–236.

"A fast quantum mechnical algorithm for database search", by Lov K. Grover, Proceedings of the 28$^{th}$ Annual Symposium on the Theory of Computing, 1996, pp. 212–219.

METHOD AND SYSTEM FOR EFFICIENTLY ALLOCATING RESOURCES FOR SOLVING COMPUTATIONALLY HARD PROBLEMS

BACKGROUND OF THE INVENTION

1. Field of Invention

This invention is directed to a method and system for efficiently solving computationally hard problems. In particular, this invention is directed to a method and system for efficiently allocating computing resources between a plurality of different solution procedures for solving the computationally hard problem. Specifically, this invention is directed to a method and system for allocating computer resources to the plurality of different solution procedures based on solution performance and risk factors.

2. Description of Related Art

There are many computationally hard or computationally intensive classes of problems for which no efficient general solution exists. In these classes of computationally hard problems, because of the combinatorics involved, the solution times for such computationally hard problems grow exponentially as the size of the problem grows arithmetically. This exponential growth makes it impossible to solve very large instances of such problems in reasonable times. This is a basic trait of the so-called NP-complete class of problems. Such extremely hard computational problems are pervasive, and exist in fields ranging from molecular biology, to physics, to operations research. Examples of such computationally harder problems include determining the most probable arrangement of cloned fragments of a DNA sequence; the global minima of complicated energy functions in physical and chemical systems; and the shortest path visiting a set of cities.

To attempt to solve these computationally hard problems, for which no generalized solution exists, a number of efficient heuristic methods have been developed. These methods, although not always guaranteed to produce a good solution or to finish in a reasonable time, often provide satisfactory answers fairly quickly. In practice, the performance of these heuristic methods varies greatly from one type of problem to another, within different instances of the same type of problem, and even within different trials of the same problem. That is, in many cases, the heuristic methods involve using randomized procedures, which give rise to performance variability even within repeated trials on a single problem instance.

In addition to the combinatorial search problems outlined above, there are many other computational situations where performances vary from one trial to another. For example, programs operating in large distributed systems or interacting with a physical world can perform unpredictably, due to changes in their operating environment. One familiar example is the action of retrieving a particular web page on the World Wide Web from a remote node on the Internet. In this case, the usual network congestion, which is highly variable, even on a second-by-second basis, leads to a variability in the time required to retrieve the page. This raises the familiar dilemma of determining whether to restart the retrieval process or wait for the current retrieval request to complete.

SUMMARY OF THE INVENTION

Conventionally, in trying to solve computationally hard problems, such as the problems outlined above, all of the available computer resources have been directed to a single instance of a single solution procedure. This results in an all-or-nothing approach to solving these computationally hard problems. For example, in the randomized heuristic methods outlined above, there may be two different such heuristic methods for solving a particular computationally hard problem, where one of the heuristic methods is simple and the other is complex. Alternatively, two instances of the same heuristic method for solving a particular computationally hard problem may have radically different performance characteristics. The inventors of the method and system of this invention have discovered that, by properly allocating the computational resources between elements of a portfolio of a plurality of such different heuristic methods and/or a plurality of different instances of a single heuristic method, the performance of the properly allocated portfolio of heuristic methods is better, both in time to complete the solution and in variability of the time to complete the solution, than any of the different heuristic methods and/or different instances of a single heuristic method of the portfolio operating alone.

In general, the unpredictable variation in performance can be characterized by distribution describing the probability of obtaining each possible performance value. The mean or expected values of these distributions are usually used as an overall measure of quality. The inventors of the portfolio allocation method and system of this invention have discovered that the expected performance should not be used as the only relevant measure of the performance quality. That is, the variance of a performance distribution also affects the quality of the solution procedure, because variance determines how likely it is that the actual performance of a particular solution procedure will deviate from the expected performance.

Thus, variance implies that there is an inherent risk associated with using such solution procedures. This inherent risk can be analogized to the financial risk associated with financial instruments. Risk is an important additional characteristic of these solution procedures because it may be worth exchanging a lower average performance for increasing the certainty in obtaining a reasonable answer. This situation is often encountered in economics, when trying to maximize a utility that has an associated risk. This situation is usually dealt with in economics by constructing a portfolio of mixed strategies that has the desired risk and performance characteristics.

In an analogy with this approach, this invention provides a portfolio allocation method and system that construct a portfolio of different solution procedures and/or different instances of the same solution procedure, such that a desired set of risk and performance characteristics are obtained.

This invention further provides a portfolio allocation method and system that provides for constructing such a portfolio that is, in terms of such desired risk and performance characteristics, preferable to any of the individual constituent solution procedures operating alone.

This invention further provides a portfolio allocation method and system for determining when to switch between different solution procedures and/or different instances of a single solution procedure when only one uninterruptible solution procedure is allowed.

This invention additionally provides a portfolio allocation method and system for generating a portfolio of different concurrently operating solution procedures and/or instances of a single solution procedure where each different concurrently operating solution procedure has a cost associated with invoking such a solution procedure.

This invention further provides a portfolio allocation method and system for efficiently managing memory, such as a cache, or display resources between a plurality of items to be stored in a memory, such as a cache, or displayed on a display when such resources are exceeded.

In short, the resource allocation method and system of this invention allocates a computational resource between elements of a portfolio of computational entities. The computational resource can be processing time, memory or display screen space.

When the computational resource is processing time, the resource is allocated between different processes executing on the processor. These different processes include different solution procedures for solving a computationally hard problem, different instances of a single solution procedure for solving the computationally hard problem, and the like. The resource is allocated to optimize the solution time or variance in the solution time.

When the computational resource is memory, the resource is allocated between files that are to be stored in the memory, where the total size of the files exceeds the available space in the memory. That is, the resource allocation method and system of this invention can be used as a cache management method and system. In this case, the available space in the memory, such as a cache, is allocated to maximize the likelihood that a file will be stored in the memory when it is needed.

When the computational resource is screen real estate, the resource is allocated between display icons that are to be displayed on the display screen, where the total area consumed by the icons exceeds the available screen real estate. The available screen real estate is allocated to maximize the likelihood that an icon will be displayed on the display screen when it is needed.

The computational resource can also be associated with a distributed network such as the Internet. In this case, the computational resource is the number of pending messages sent across the distributed network, pendancy time of a message sent across the distributed network, priority of the messages sent across the distributed network, and/or cost of the messages set across the distributed network.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
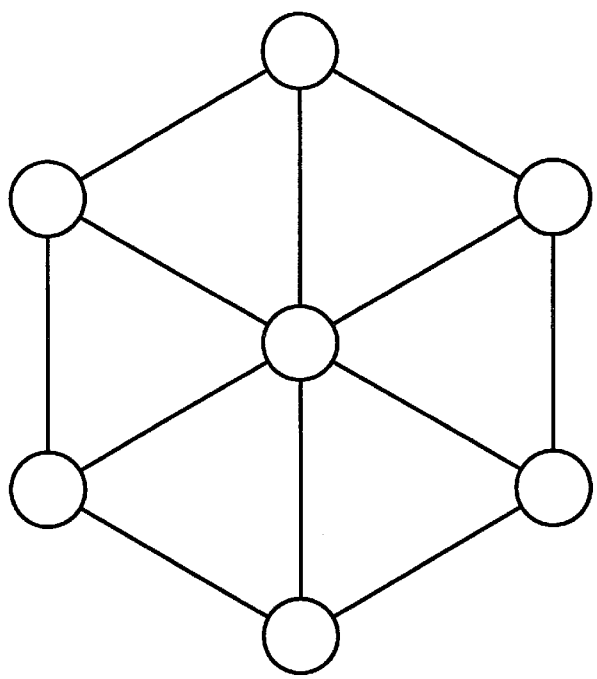
FIG. 1 is an example of a computationally hard problem.

FIG. 1 shows a simple example of a graph coloring problem, a computationally hard problem to solve. In particular, the time necessary to solve the graph coloring problem rises exponentially as the number of nodes of the graph and their interconnectivity rises arithmetically. The graph coloring problem is one example of an NP-complete problem. These NP-complete problems take an enormous amount of effort to solve. Moreover, these NP-complete problems are crucial in many fields.

In general, these NP-complete problems, and other computationally hard problems, are so difficult that the optimal solution is often to use the so-called Las Vegas method, which involves methodically wandering around the solution space in search of an answer. Las Vegas methods often begin calculating from random starting positions. If the random starting position is reasonably close to the correct solution for the particular NP-complete problem, the Las Vegas method quickly results in an optimal answer to the problem. However, if the random starting position is distant from the correct solution to the NP-problem, a Las Vegas method solution procedure will waste considerable computer resources analyzing areas of the solution space unlikely to result in a correct answer.

NP-complete problems often have two or more different solution procedures available to solve the particular problem. Additionally, even if two or more different solution procedures are not available, NP-complete problems often use such random starting positions, where each instance of the solution procedure with a different starting position can provide radically different performance characteristics in solving the problem.

Accordingly, the portfolio allocation method and system of this invention allow such computationally hard problems, such as NP-complete problems, to be solved more efficiently with a portfolio of different solution procedures and/or different instances of a single solution procedure than can be obtained from any one of the portfolio of procedures alone.

In the computationally hard problems outlined above, the unpredictable variation in performance can be characterized by distribution describing the probability of obtaining each possible performance value. The mean or expected values of these distributions are usually used as an overall measure of quality. The portfolio allocation method and system of this invention further determine a variance of the performance distribution. The variance of a performance distribution also affects the quality of an algorithm, because it determines how likely it is that the performance of a particular instance of the solution procedure will deviate from the expected performance. This variance thus defines an inherent risk associated with using the particular solution procedure.

Risk is an important additional characteristic of these solution procedures because a lower average performance value may be reasonably exchanged for an increased certainty in obtaining a reasonable answer. This situation is often encountered in economics when trying to maximize a utility that has an associated risk. The situation is usually dealt with by constructing mixed strategies that has the desired risk and performance.

In an analogy with this approach, the portfolio allocation method and system of this invention are directed to constructing a portfolio of two or more such solution procedures. In particular, the portfolio combines different solution procedures and/or different instances of a single solution procedure in such a way that a whole range of performance and risk characteristics become available. The portfolio allocation method and system of this invention thus construct portfolios that produce risk and performance characteristics that are preferable to the risk and performance characteristics of any of the individual components of the portfolios.

The portfolio allocation method and system of this invention can be illustrated by considering a simple portfolio of two Las Vegas-type solution procedures. These Las Vegas-type solution procedures, by definition, always produce a correct solution to a problem but with a distribution of solution times. The portfolio is constructed simply by letting both solution procedures run concurrently but independently on a serial processor. In particular, a first one of the solution procedures is allocated a fraction "$f_1$" and the second solution procedure is allocated a second fraction "$f_2$" of the processing time allocated to the portfolio, where $f_1+f_2$ is equal to 1.

As soon as one of these solution procedures finds a solution, the portfolio is terminated. Thus, the solution time "t" is a random variable related to the random variables of the individual solution procedures. In particular, the solution time t is:

$$t = \min\left(\frac{t_1}{f_2}, \frac{t_2}{f_2}\right), \quad (1)$$

where:

$t_1$ is the random variable for the first solution procedure; and $t_2$ is the random variable for the second solution procedure.

The resulting portfolio is characterized by the probability distribution "p(t)" that the portfolio terminates at a particular time t. This probability is given by the probability that both constituent algorithms finish in time greater than or equal to t less the probability that both algorithms finish in time greater than t. That is:

$$p(t) = \left[\sum_{t' \geq f_1 t} p_1(t')\right]\left[\sum_{t' \geq f_2 t} p_2(t')\right] - \left[\sum_{t' > f_1 t} p_1(t')\right]\left[\sum_{t' > f_2 t} p_2(t')\right] \quad (2)$$

where:

$p_1$ (t) is the probability distribution of the solution times for the first solution procedure; and $p_2$ (t) is the probability distribution for the solution times of the second solution procedure.

Therefore, each value of $f_1$ corresponds to a distribution whose mean and variance can be calculated.

For example, the two solution procedures can be two heuristic methods for solving a computationally hard problem, where the first heuristic is a simple method and the second heuristic is a complex method. The simple heuristic method will return a fast, fairly high-quality answer but with a large degree of uncertainty. In contrast, the complex heuristic method is more reliable, in that the answer is more likely to be correct, and will return a much higher quality answer than the simple heuristic method, but will take a much longer time to reach the higher quality answer. The expected performance of each of these methods is defined in terms of speed, or inverse time to completion, and by the associated uncertainty of the answer. That is, the uncertainty in the performance of the methods is defined by the means standard deviation in the distribution of performances against a number of similar test cases for each method. In particular, the associated uncertainty of the complex heuristic method will usually be lower than the associated uncertainty of the simple heuristic method.

Then, if $f_1$ is the fraction of processing time allocated to the simple heuristic method and $f_2$ is the fraction of processing time allocated to the complex heuristic method, as outlined above, the total expected performance "P" for a given amount of processing time will be the weighted average of the expected performances of the two heuristic methods. That is, the total expected performance P is:

$$P=t[f_1p_1+f_2p_2], \quad (3)$$

where:

P is the total expected performance;

t is the total processing time allocated to the portfolio;

$f_1$ is the fraction allocated to the simple heuristic method;

$f_2$ is the fraction allocated to the complex heuristic method;

$p_1$ is the expected performance of the simple heuristic method; and $p_2$ is the expected performance of the complex heuristic method.

The overall uncertainty of the portfolio can then be expressed in terms of the uncertainties associated with each of the heuristic methods. In this simple situation, where the answers provided by each of the two heuristic methods are uncorrelated, the overall uncertainty is:

$$\sigma=[f_1^2\sigma_1^2+f_2^2\sigma_2^2]^{0.5}, \quad (4)$$

where:

$\sigma$ is the overall uncertainty associated with the portfolio;

$\sigma_1$ is the uncertainty associated with the simple heuristic method; and $\sigma_2$ is the uncertainty associated with the complex heuristic method.

Significantly, there is a range of values for the fractional allocations f for which the overall uncertainty of $\sigma$ is lower than either of the uncertainties $\sigma_1$ or $\sigma_2$ associated with the two heuristic methods. This arises as a consequence of the dependence of the overall uncertainty of $\sigma$ on the uncertainties $\sigma_1$ and $\sigma_2$ associated with these two heuristic methods. Specifically, the fraction f which generates the minimum uncertainty $\sigma_{min}$ is:

$$f_{1min} = \frac{\sigma_1^2}{\sigma_1^2 + \sigma_2^2}, \quad (5)$$

where $f_{1min}$ is the fraction of processing time devoted to the simple heuristic method. Similarly, $f_{2min}$ can be determined by substituting a for a, in the numerator of Eq. (5).

Figure 2:
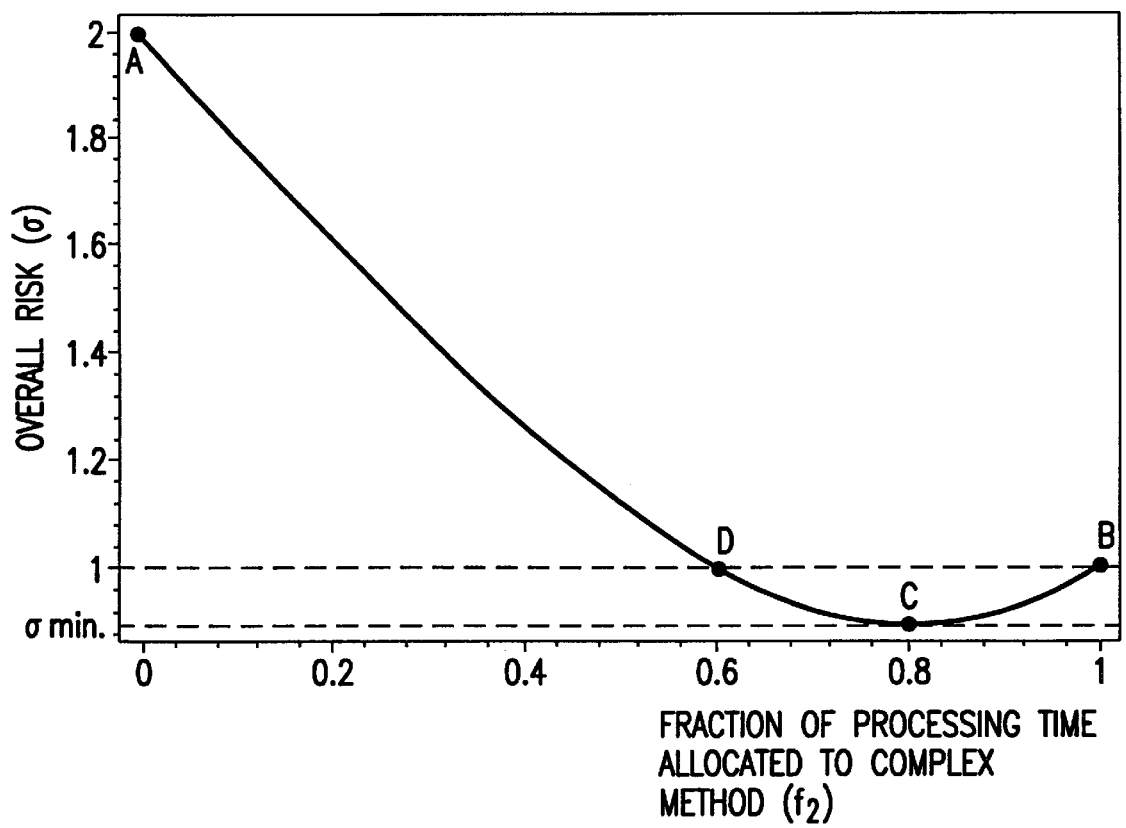
FIG. 2 is a graph outlining the overall risk associated with two different solution procedures as the fraction of computer resources is altered between the two solution procedures.

The minimum uncertainty $\sigma_{min}$ can be observed when plotting the overall risk $\sigma$ as a function of the fraction f of processing time allocated to the complex method, as shown in FIG. 2. It should be appreciated that, if the overall risk $\sigma$ were plotted against the fraction f of processing time allocated to the simple method, the curve shown in FIG. 2 would be rotated 180° about a vertical axis extending through its midpoint. The numerical values shown in FIG. 2 were obtained by assuming the simple heuristic method has an associated uncertainty or risk that is twice as large as the associated risk of the complex heuristic method. Thus, the overall risk shown in FIG. 2 is normalized to the risk associated with the complex heuristic method.

As shown in FIG. 2, when all of the processing time is allocated to the complex method, the overall risk is equivalent to the risk associated with that method. Thus, when the fraction of processing time is allocated to the complex method is equal to 1, the overall risk is equal to 1. In contrast, when the fraction of processing time allocated to the complex method is zero, i.e., the fraction of processing time is allocated entirely to the simple heuristic method, the overall risk is equal to 2, the risk associated with the simple method. This is expected. Unexpectedly, however, when the fraction of processing time allocated to the complex method is between about 60 percent to just less than 100 percent, the overall risk associated with the portfolio of the simple and complex heuristic methods is less than 1. That is, the overall risk of the portfolio is less than the associated risk of either method. Thus, using several solution procedures together to solve a computationally hard problem leads to a decreased uncertainty in the result.

The overall expected performance can be defined in two possible ways. The overall performance can either be the performance that would be obtained when minimizing the overall uncertainty. This would be equivalent to determining the performance obtained at the fractional allocations that generate the minimum uncertainty $\sigma_{min}$. Alternatively, the performance can be defined based on the most efficient allocation of the available computational resources, such as the processing time. The overall performance defined in this way is obtained by rewriting Eq. (4) to solve for the desired fraction of time $f_1$ or $f_2$ and replacing the appropriate fraction $f_1$ or $f_2$ in Eq. (3) with the right-hand side of the rewritten Eq. (4). This thus relates the expected performance to the overall risk. The behavior of this equation is graphically shown in FIG. 3.

Figure 3:
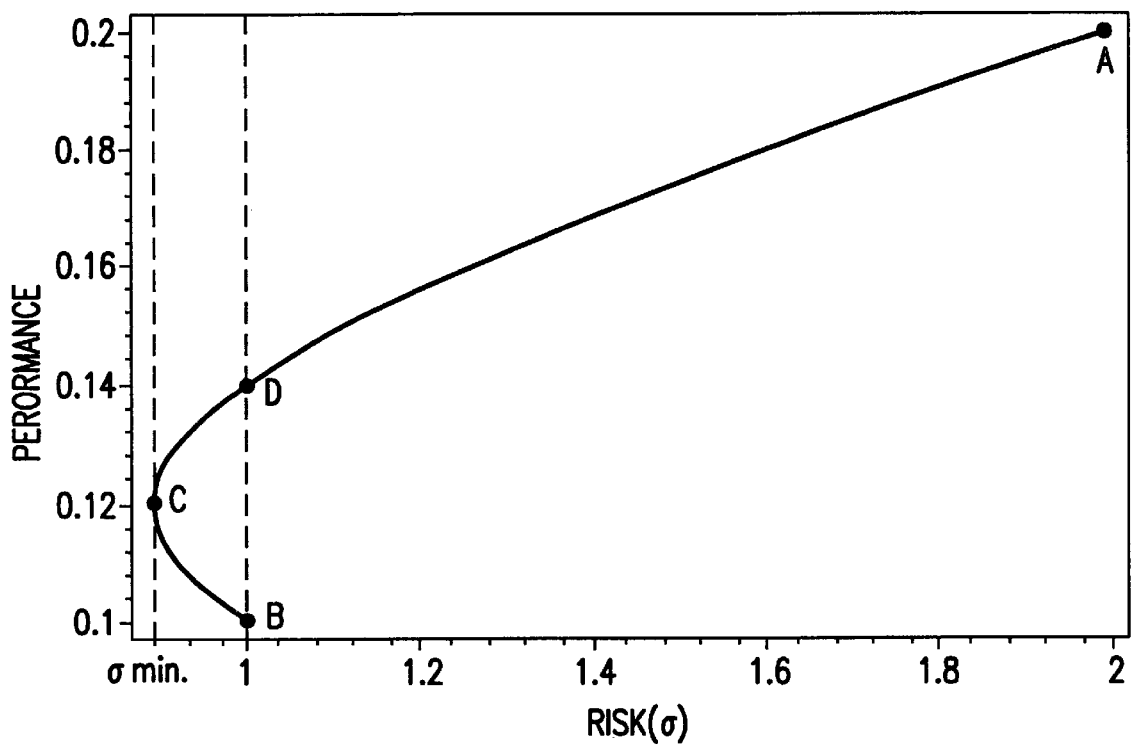
FIG. 3 is a graph outlining the overall expected performance as a function of risk for the parameter value shown in FIG. 2.

As shown in FIG. 3, the upper branch of the curve, between the points C and A, corresponds to the efficient allocation of the computational resources, such as processing time, as this portion of the curve yields increasing performance with increasing risks. More significantly, since the points A and B correspond to the risks associated with using only the simple heuristic method or only the complex heuristic method, respectively, there is a regime of the curve between the points B and D, to the left of the value for $\sigma_2$ for the complex heuristic, for which a larger expected performance at a lower risk is obtained than is obtainable by using solely the complex heuristic method. That is, there is an allocation between the two heuristic methods forming the portfolio which provides the identical risk as using the more complex heuristic algorithm but which provides a significantly higher performance.

Additionally, and equally significant, for any value of risk between the points B and C, there is an equal risk value between the points C and D having a higher performance. Thus, by providing the allocation between the complex and simple heuristic methods corresponding to point D of FIG. 3, the portfolio provides a higher performance than using only the complex, but higher quality, heuristic method without any increase in the risk associated with that method.

Thus, even when a given computationally hard problem requires that the uncertainty associated with solving the computationally hard problem cannot be increased over the risk provided by the best solution procedure, providing a portfolio of solution procedures allows the expected performance to be increased. Moreover, in computationally hard problems that do not require limiting the overall risk in this way, an ability to increase the overall uncertainty can lead to a further increase in the expected performance, by using an allocation corresponding to points between points D and A of FIG. 3. Thus, given a tolerable amount of uncertainty to be used in solving the computationally hard problem, a desired expected performance can be selected from the efficient branch of the curve shown in FIG. 3. From the selected expected performance, Eq. (3) can be used to determine the fractions of time the particular solution procedures of the portfolio will be allocated to solve the computationally hard problem.

Another portfolio that exhibits interesting behavior is a portfolio containing two instances of a solution procedure that has two possible solution times. That is, the solution procedure can solve the computationally hard problem in time $t_1$ with probability $p_1$ or in time $t_2$ with probability $p_2$ where $p_1+p_2 1$. The portfolio then comprises two independent instances of the solution procedure. By allocating the processing time between these two instances, the risk/expected time curve shown in FIG. 4 can be obtained for particular values of $p_1/p_2$ and T, where $t_1=1$ and $t_2=T$. There are several significant features of the curve shown in FIG. 4. First, the endpoint A corresponds to either instance of the solution procedure running alone. That is, $f_1/f_2$ is either 1/0 or 0/1. Additionally, the endpoint B corresponds to both instances sharing the available processing time equally. That is, $f_1=f_2=0.5$.

More importantly, there is a portion of the curve between the points C and D, called the "efficient frontier", where, for every point on the curve between points C and A and between points D and B, there is at least one point on the efficient frontier between points C and D that is always preferable to a point between the points A and C and between D and B. The points on the efficient frontier are preferable because they either have a lower risk, a higher performance, or both.

Figure 5:
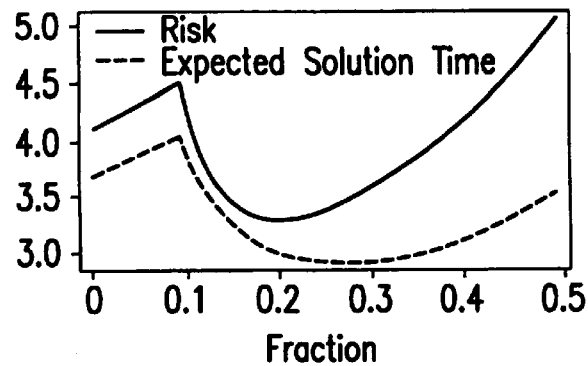
FIG. 5 is a graph outlining the risk and expected solution times as a function of resource allocation for the situation depicted in FIG. 4.

Once the efficient frontier is determined, the desired performance/risk combination can be chosen based on it. From the desired performance/risk combination, the corresponding allocation of processing time between the two instances of the solution procedure can be determined. In particular, this allocation can be determined by plotting both the expected solution time and the risk as a function of the allocation. This is shown in FIG. 5.

It should be appreciated that the efficient frontier for this distribution will persist as t is reduced from 10 to 3.5. The lower bound corresponds to a value of the ratio "σ/t" of 0.65. This value is known as the Sharpe ratio in the finance literature, and indicates the kinds of distributions that can be used in the method and system of this invention. It should also be appreciated that Eq. (2) applies to any discrete distribution, and can be readily generalized to continuous distributions. It should also be appreciated that this procedure therefore also applies to more complicated situations. For example, by extending Eq. (2) to include the minimum of more than two random variables, the solution portfolio can include three or more different solution procedures and/or different instances of a single solution procedure, where each solution procedure is allocated its own fractional share of the computational resources. In this case, varying the fractions allocated to each solution procedure produces a two-dimensional region in the risk-expected time plane, rather than a single curve. The efficient frontier is then a subset of the boundary of that region.

To test the method and system of this invention with more realistic distribution functions, the portfolio allocation method of this invention was applied to the often-studied NP-complete problem of graph-coloring, described above. The graph-coloring problem is applied to a collection of points or nodes, some of which are connected by straight edges, and comprises coloring the nodes using a specified number of colors such that no two nodes linked by an edge have the same color. The connectivity of the graph, i.e., the average number of edges entering or exiting a node in the graph, is a convenient parameter describing the amount of constraint in the problem and determines the typical behavior of a variety of search methods.

The graph used to test the portfolio allocation method of this invention is a 100-node graph having a connectivity of 3.5 and a specified color number of 3. Three-color graphs with this connectivity have been shown to exhibit a large variance of finishing times over the class of such graphs.

A complete, depth-first backtracking search based on the Brelaz heuristic was used as the base solution procedure. This solution procedure assigns colors to the most-constrained nodes first, breaking ties by choosing nodes with the most-uncolored neighbors and with any remaining ties broken randomly. For each node, the smallest-numbered color consistent with the previous assignments was chosen first, with successive choices made when the search was forced to backtrack. This search method is guaranteed to terminate eventually having correctly found a possible coloring, or having concluded that no such coloring exists for the graph. Thus, it is a Las Vegas-type method.

Figure 6:
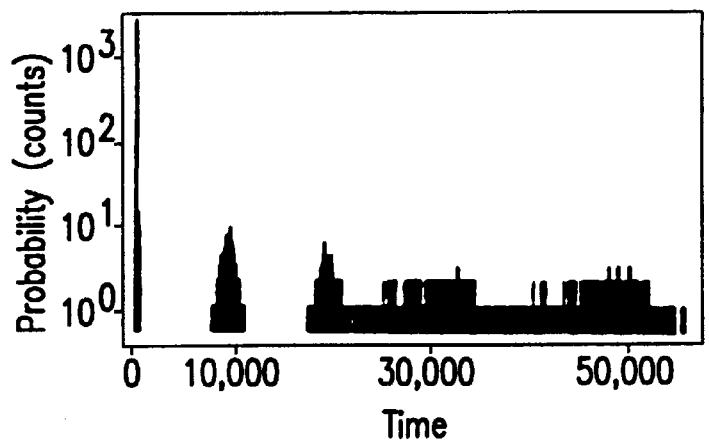
FIG. 6 is a graph outlining the measured probability distribution for the Brelaz heuristic solution procedure for the graph-coloring problem outlined in FIG. 1 for a particular 100-node graph having a connectivity of 3.5 for 10,000 different solution instances.
Figure 7:
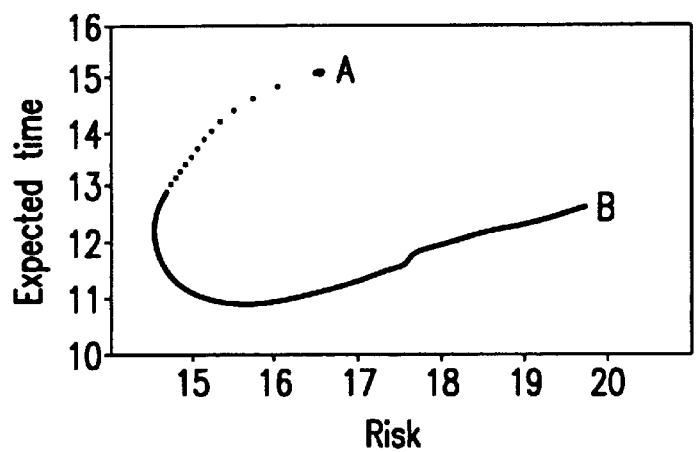
FIG. 7 is a graph outlining the experimental performance versus risk for the graph coloring problem as a function of resource allocation based on the probability distribution shown in FIG. 6.

A probability distribution of the solution times, as shown in FIG. 6, was produced by running the Brelaz heuristic method repeatedly on a graph-coloring instance. Because the distribution shows a larger variability in solution times, the portfolio allocation method and system of this invention are expected to make accessible points in the risk/expected solution time plane that are preferable to the one point accessible by running the heuristic method by itself. Eq. (2) was applied to two independent instances of this solution procedure to produce the expected solution time/risk curve shown in FIG. 7. The functional similarity between the curves shown in FIGS. 7 and 3 is apparent, confirming the predictions made relative to the simplified example.

In this case, the efficient frontier is in the range $0.013<f_1<0.060$. The low end of this range locates the point of minimum risk, while the high end locates the point of maximum performance. The extremely small value for $f_1$ indicates that only a slight mixing of strategies is required to provide significant performance benefits. This arises because of the relatively high probability that these solution procedure will find the solution fairly quickly. These results confirm the benefits obtainable when using the portfolio method and system of this invention. In particular, as shown in FIG. 7, performance can be increased by about 30 percent at risk when a multi-procedure portfolio is used.

The efficient portfolio constructed for this particular graph was also tested to determine whether this portfolio would be effective on other graphs whose distributions of solution times were unknown. Using this portfolio, with $f_1$ was set to 0.013, on twenty randomly-chosen graphs yielded an average speed improvement of 22%, and an average risk improvement of 10%.

Independent studies of a variety of NP-complete problems, using very different search procedures, have discovered distributions which are very similar to the distributions outlined above with respect to the graph coloring problem. Additionally, it is commonly understood that any procedure that performs a depth-first backtracking search through a hierarchical tree will have a highly extended performance distribution. This arises because early, high-level choices can decide immediately whether a particular instance of the method will take a short time or a much longer time. This variability in performance makes it possible to predict when a particular heuristic will have the appropriate properties that render it amenable to the portfolio allocation method of this invention. Thus, while the method and system of this invention have thus far been described in relation to NP-complete problems, the portfolio allocation method and system of this invention can be applied much more generally than this.

In the various examples discussed previously, it was assumed that the component solution procedures forming the portfolio are both independent of each other and do not communicate with each other. Thus, the solution procedures discussed so far can be described as "competing" with each other for machine resources. However, by providing a framework for cooperation, or adding dependencies, among the individual solution procedures of the portfolio while they are simultaneously executing can further improve performance. In general, cooperation between the constituent solution procedures of the portfolio is introduced by adding statistical correlations between the performances of the individual solution procedures. In particular, the correlation between individual solution procedures is:

$$\rho = \frac{\text{cov}(t_1, t_2)}{\sqrt{\text{var}(t_1)\text{var}(t_2)}} \quad (6)$$

where:

cov($t_1$, $t_2$) denotes the covariance of the performance of two of the solution procedures of the portfolio;

var($t_1$) is the square of the risk, $\sigma_1^2$, of a first one of the pair of correlated solution procedures; and var($t_2$) is the square of the risk, $\sigma_2^2$, of the second one of the pair of correlated solution procedures.

Figure 8:
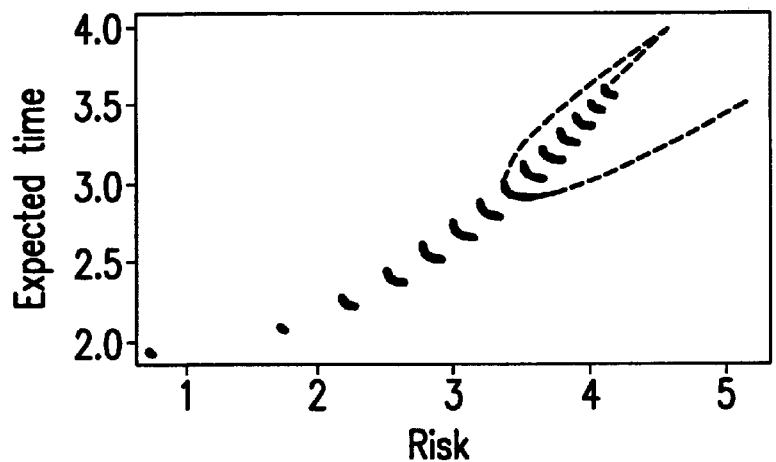
FIG. 8 is a graph outlining the efficient frontiers for allocation between two different solution procedures as a function of correlation between the distributions of the solution procedures.

As shown in FIG. 8, when the two solution procedures are negatively correlated, adding cooperation between the pair of correlated solution procedures increases their performance as well as reduces the risk. In particular, FIG. 8 shows the effective cooperation between two solution procedures having the discrete bimodal distribution of solution times described above. In particular, FIG. 8 shows the resulting efficient frontiers as the correlation between the two distributions is varied. In FIG. 8, the correlation was varied from a value of 0.42, corresponding to the points at the upper right, to −0.42, corresponding to the points at the lower left. FIG. 8 also shows the entire risk-expected solution time curve corresponding to a correlation of 0, i.e., the curve of FIG. 4, superimposed on the plot of efficient frontiers of FIG. 8.

As shown in FIG. 8, as the positive correlation increases, the net benefit from providing two different solution procedures, and/or two different instances of the same solution procedure, decreases until it is effectively equal to providing only a single solution procedure. This arises because, as the positive correlation between the two solution procedures increases, the additional information provided by the second solution procedure generally decreases.

In contrast, increasing the negative correlation between the two solution procedures decreases the risk, decreases the expected time, thus increasing the performance, and decreases the size of the efficient frontier. This benefit is easily understood in that negative correlations mean that a first solution procedure is particularly good precisely on those cases that are more difficult for the second solution procedure, and vice versa. That is, the negative correlation acts to increase the additional information provided by the second solution procedure beyond that provided when the solution procedures of the portfolio are uncorrelated.

This negative correlation allows the portfolio, which terminates as soon as the one of the constituent solution procedures reaches a solution, to work even better than when the individual solution procedures are uncorrelated. In the case of the graph-coloring problem outlined above, cooperation between the two solution procedures can be implemented by allowing one of the solution procedures to use incomplete assignments of colors to nodes generated by another of the solution procedure as a "hint" in its own further solution attempts. This can be implemented by the constituent solution procedures posting the incomplete assignments of colors to a common memory.

One important feature of the portfolio allocation method and system of this invention is the ability to dynamically change the portfolio allocation while the solution procedures of the portfolio are executing to solve the particular computationally hard problem. For example, a particular computationally hard problem may be most efficiently solved using a portfolio allocation having two identical solution procedures whose distributions are, however, unknown. This situation is described by Eq. 2, when $p_1(t)=p_2(t)$ is unknown. Using a maximum likelihood estimate of $p_1(t)$, is possible to optimally exploit observations of p(t) while dynamically adjusting the portfolio allocation in order to get progressively better estimates of $p_1(t)$ and $p_2(t)$. Thus, it becomes possible to converge on efficient values of $f_1$ and $f_2$ as more information is received. In particular, the portfolio allocation can be dynamically changed in response to either changing operating conditions or to optimally exploit information about an unknown environment gained over time. Thus, the portfolio allocation can be dynamically adapted in situations where information is either incomplete or changes over time.

Another important generalization of the portfolio allocation method and system of this invention is provided by the way Monte Carlo procedures for optimization are usually implemented. In particular, the time it takes to find an acceptable move in an optimization problem has the characteristics of a Las Vegas-type solution procedure. The portfolio allocation method of this invention was thus tested using a simulated annealing algorithm on a vector-quantization problem associated with clustering. A speed improvement of 5–10 times was obtained.

A more exotic example of the applicability of the portfolio allocation method and system of this invention is the construction of a portfolio for a general database search that exploits the properties of quantum computation. Because the probability distribution of search times in such cases is known, the portfolio allocation method and system of this invention can be used to optimize the trade-off between risk and expected search time.

In the examples described above, the portfolio allocation method and system of this invention have been described relative to the allocation of limited computational resources, such as processor time, between different simultaneously-executing solution procedures and/or different instances of a single solution procedure. However, the portfolio allocation method and system of this invention are not limited to allocating computational resources to solution procedures. Rather, the portfolio allocation method and system of this invention can also be applied to allocating computational resources to quantitatively manage risk and cost associated with executing transactions over a distributed network environment or of such limited computational resources as memory and screen real estate.

By defining the cost or performance as the time and/or actual cost imposed to complete a transaction over a distributed network, and by defining the risk as the variance in that time or cost, an efficient allocation of resources between simultaneously or serially executing transactions can be obtained. That is, the portfolio allocation method and system of this invention yield mixed strategies that allow an efficient trade-off between the average time and/or cost a transaction will require and the variance or risk in that time or cost. As in the portfolio allocation method for solving computationally hard problems, the portfolio allocation and system of this invention identifies mixed strategies that execute transactions at a lower average cost and with a smaller variance in the cost.

A transaction is defined as a round-trip message sent from one computer to another over a distributed network, such as the Internet. The process is considered to be wholly automated, such that, when a message is received by the receiving computer, it is assumed to be processed in a fixed amount of time. After processing, at least an acknowledgment is sent back to the computer that originated the message.

In a large and a congested distributed network, the time it takes to send and receive a message is a random variable. If the probability density function p(t) for this time is known, the expected duration of (t) for the transaction is:

$$\langle t \rangle = \int_0^\infty t p(t) dt, \qquad (7)$$

and the risk σ is:

$$\sigma = \sqrt{\mathrm{Var}[t]} = \sqrt{\langle (t - \langle t \rangle)^2 \rangle}. \qquad (8)$$

However, as the congestion on the distributed network, such as the Internet, increases, it is likely that after a message has been sent, no acknowledgment will have been received for some time T. This time T can be very long in cases there the probability density function P(t) has a long tail. In this case, the user is faced with the choice of either continuing to wait for the acknowledgment, canceling the original message and sending out a new message, or, if the distributed network protocols so permit, sending out a second message without canceling the first message. It should be appreciated that the receiving computers on the distributed network can always be programmed to ignore duplicate messages, so that sending another message need not cause any confusion.

In particular, when browsing the World Wide Web using a browser such as Netscape Navigator™, requests for files which are taking a long time to download requires canceling the original message before sending a new request to download the file. However, as is familiar to most users of the World Wide Web, this strategy is often significantly advantageous. However, it is impossible to determine when to implement this strategy most advantageously. An expected duration and an expected risk for a transaction using this restart strategy can be calculated for each possible value of T in terms of the probability density function P(t).

In particular, if the probability density function for the completion time is P(t), a choice of a restart time $\tau$ yields a new probability density function P'(t) for that restart strategy. The new probability density function P'(t) is given by the probability that the task does not complete in exactly "floor[t/$\tau$]" restarts before finally completing. Here, "floor[ ]" simply gives the nearest integer less than "t/$\tau$". Thus, the new probability density function P(t) for the restart strategy is:

$$P(t) = p\left(t - \tau \text{ floor}\left[\frac{t}{\tau}\right]\right)\left[1 - \int_0^\tau dt' p(t')\right]^{floor\left[\frac{t}{\tau}\right]}. \tag{9}$$

for a probability density function of this form, the expectation of any function can be written as a series:

$$\langle f(t) \rangle = \sum_{i=0}^{\infty} \left[1 - \int_0^\tau dt' p(t')\right]^i \int_0^\tau dt'' f(t'' + i\tau) p(t''). \tag{10}$$

If, for ease of notation, four new variables "a", "b", "c" and "d" are defined as:

$$a \equiv 1 - \int_0^\tau dt\, p(t),$$

$$b \equiv \int_0^\tau dt\, p(t),$$

$$c \equiv \int_0^\tau dt\, t p(t), \text{ and}$$

$$d \equiv \int_0^\tau dt\, t^2 p(t).$$

The first and second moments for the restart strategy can be calculated from the semi-summing series obtained from Eq. (10). The first and second moments turn out to be the derivative of the geometric series. As a result, the expected time is:

$$\langle t \rangle = \frac{1}{b}(c + \tau a). \tag{11}$$

Similarly, using this result:

$$\langle t^2 \rangle = \frac{1}{b}\left[d + \tau a\left(2\frac{c}{b} + \tau\left(1 + \frac{2}{b}\right)\right)\right], \tag{12}$$

and solving for $\sigma$ as set forth in Eq. (8) provides the risk. If N messages are independently transmitted, where each message has the probability density function p(t) for its completion time, the probability that all N messages will take longer than some time t is:

$$G(t) = Prob[ > t] = \left(\int_t^\infty dt' p(t')\right)^N. \tag{13}$$

The probability density function P(t) for this multiple strategy is simply the negative of the time derivative of the cumulative distributive function G(t). That is:

$$P(t) = -\frac{dG(t)}{dt} = N\left(\int_t^\infty dt' p(t')\right)^{N-1} p(t). \tag{14}$$

From this probability density function P(t), the risk and expected time for the portfolio of N messages can be determined.

As $\tau$ increases towards infinity, the restart strategy approaches having no restart strategy at all. As $\tau$ decreases, different expected times and risks result. In particular, the dependence of expected time and risk on $\tau$ can be shown on a plot of expected time versus risk. For some distributions of the probability density function p(t) for sending and receiving a message, a restart strategy can make accessible points in the expected time/risk plane which are unequivocally preferable to the expected time and risk resulting from foregoing the restart strategy.

Figure 9:
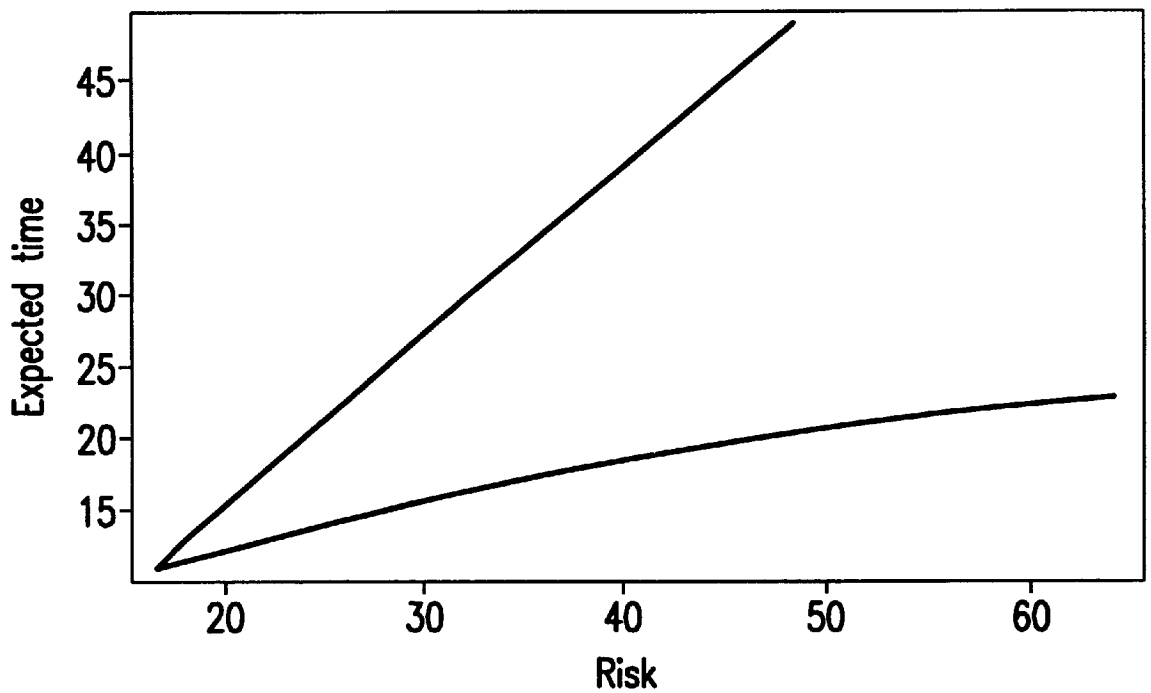
FIG. 9 is a graph outlining the expected transition completion time versus risk for a restart strategy.

FIG. 9 shows such a situation, where the distribution is a lognormal distribution. The probability density function for a lognormally distributed random variable is:

$$p(t) = \frac{1}{t\sigma\sqrt{2\pi}} e^{-\frac{(\log t - \mu)^2}{2\sigma^2}} \tag{15}$$

This probability density function has a long tail compared with a normal distribution of the same mean and variants. The cusp of the curve shown in FIG. 9 corresponds to an approximate value for $\tau$ of 12.5. The cusp yields significant speed and risk improvements. In particular, the cusp represents the restart strategy which is preferable to all other points, as no other point of the curve as shown in FIG. 1 has a lower expected completion time even at a higher risk cost, or a lower risk, even at a higher expected time cost. In particular, in the curve shown in FIG. 1, the log normal parameters $\mu$ and $\alpha$ are 2 and 1.5, respectively. The lower right end point of the curve corresponds to no restart strategy and the upper left end point corresponds to very short restart times.

Of course, this restart strategy is not the only possible one. If canceling the message is not required under the network protocol, then another message can simply be sent after waiting some time $\tau$. In particular, the most appropriate strategy in this case is to send many messages at the same time. This, of course, assumes that the messages do not take the same path through the distributed network. The resulting expected time and risk, as a function of the number of messages sent N is set forth in Eq. (13) outlined above.

Clearly, in a distributed network that does not impose any usage-based pricing, sending many transaction messages to begin with is the best strategy, so long as N is not so large that it overwhelms the target computer. However, it should be appreciated that other users sending messages on the distributed network will also be aware of this optimal solution, resulting in exactly the congestion that the multiple message strategy is intended to deal with.

This paradoxical situation, sometimes called a social dilemma, arises often in the consideration of "public goods", such as natural resources, highways, agriculture community grazing lands and the like and has been extensively studied. In particular, the paradox disappears if users are charged in proportion to their use. Accordingly, there are many suggestions to impose usage pricing schemes on distributed networks such as the Internet.

A simple pricing scheme for distributed networks, such as the Internet, charges users in proportion to the amount of data they upload or download. In this case, the restart strategies outlined above would now have an expected monetary cost associated with them, as a function of the restart time $\tau$. Specifically, for any time $\tau$, an expected number of restarts can be determined. By multiplying the expected number of restarts by the fixed cost of each message, assuming each message is merely a copy of the first and thus has a fixed size, the monetary cost for each research strategy can be determined. In effect, this kind of pricing scheme simply adds a third dimension to the time/risk curve, in addition to the expected time and the expected risk, on which a restart strategy must be evaluated. That is, the relevant curve containing all of the information necessary to choose a restart strategy exists in the three dimensions of expected time, expected risk, and expected monetary costs.

Figure 10:
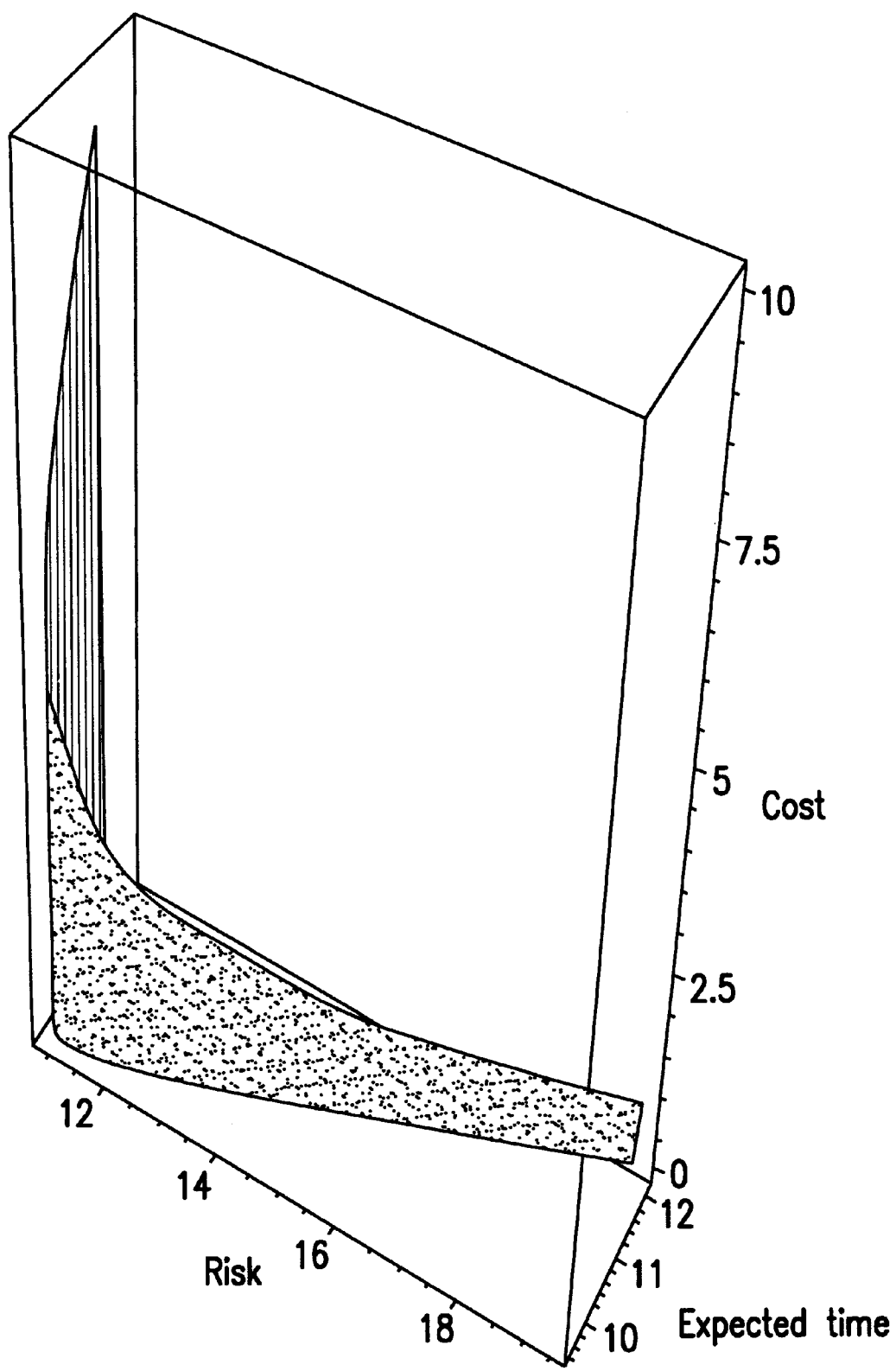
FIG. 10 is a graph outlining the expected cost for various restart strategies in an area around the cusp of the curve shown in FIG. 9.

FIG. 10 shows the three-dimensional extension of the curve shown in FIG. 9, assuming that each restart has a unitary/monetary cost. In particular, for clarity, the curve shown in FIG. 10 is drawn as a surface. However, only the points on the upper edge of the curved bannister define accessible strategies. It should also be appreciated that the lower edge, lying in the risk-expected time plane is exactly that shown in FIG. 1. Thus, a particular risk-expected time strategy, corresponding to a particular restart strategy $\tau$, has an expected cost equal to its expected number of restarts. That is, the expected cost is simply the height of the surface of the curve shown in FIG. 10. It should also be appreciated that, in FIG. 10, only the strategies near the cusp are illustrated, in particular, these strategies are obtained for values of $\tau$ between 0.3 and 15. Importantly, when pricing is taken into account, the addition of the extra expended monetary cost dimension means that the cusp of the curve shown in FIG. 1 is no longer necessarily the optimal restart strategy. In particular, although this restart strategy is the point providing the lowest expected transaction time and the lowest expected risk, this point also has expected monetary cost that is more expensive than using no restart strategy at all. It is thus up to the user to decide if the faster execution time and the lower risk is balanced by the extra expense.

Similarly, for the restart strategy comprising sending N initial copies of the message, the expected cost is a linear function of N. Thus, while a different three-dimensional curve would result, the same performance/monetary costs argument applies. Thus, even if sending 100 messages yields a very fast expected execution, the monetary costs would be 100 times higher than sending only one message. Thus, while the monetary cost must now also be weighed, the portfolio allocation method and system of this invention allow the user to access performance values on the expected time/risk/monetary cost curve, which would otherwise be inaccessible without a restart strategy. That is, the portfolio allocation method and system of this invention allow the user the freedom to choose among a range of possibilities.

In the example outlined above, the transaction cost associated with each message was fixed. However, it should be appreciated that other pricing strategies allow the priority of the message to be increased by increasing the price paid for the message. Thus, it may be possible to gain improvements in expected execution time and/or the expected risk for a fixed budget, simply by sending two or more copies of the message at two different priorities, in such a way that the total cost of such a mixed strategy would still be equal to the cost of sending one copy at the maximum priority. Thus, in this case, the allocated resource is total cost rather than total processing time or number of messages. For example, the time it takes to send a message of a fixed size at the highest priority F has a probability density function of p(t). Additionally, it is possible to send data at some lower priority f, where $0<f\leq 1$, normalized to F.

Then, the probability density function for a message set at this priority f is p(ft). In one instance, the probability density function p(t) may be:

$$p(t)=0.5\delta(t-1)+0.5\delta(t-10). \quad (16)$$

That is, the probability that the transaction time is one second is equal to the probability that the transaction time is 10 seconds. Furthermore, for a lower priority level f equal to F/10, the probability density function p(ft) is:

$$p(t)=0.5\delta(t-10)+0.5\delta(t-100), \quad (17)$$

That is, the expected completion time for a message at the higher priority level F/10 is 10 seconds. Furthermore, this shorter completion time is equally likely as a completion time of 100 seconds. Thus, at a lower priority, the transaction has both a higher expected completion time and a higher risk. In this example, the monetary cost of sending a constant size message is proportional to the priority f. Two copies of a single message can then be sent at different priorities $f_1$ and $f_2$, such that the sum of the priorities $f_1$ and $f_2$ is one. This is equivalent to the fractional allocations $f_1$ and $f_2$ outlined above where the fraction allocations $f_1$ and $f_2$ equal 1. If the constant of proportionality between the monetary cost and the priority level is set to 1, the monetary cost for this portfolio of mixed strategies is equal to the cost of sending a single copy at the highest priority F. The duration of the transaction is then given according to Eq. (1) outlined above. In this case, the independent random variables $t_1$ and $t_2$ each have the distribution outlined in Eq. (16). By allowing the fractional priorities $f_1$ and $f_2$ to vary, the expected time/risk curve shown in FIG. 11 can be determined. In particular, each point on the curve shown in FIG. 11 corresponds to a particular allocation of the fractional priorities $f_1$ and $f_2$, in the same way that the curve shown in FIG. 10 is a function of $\tau$.

Figure 4:
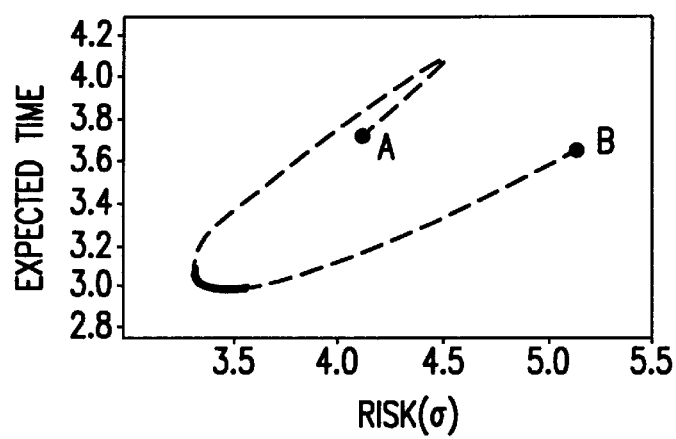
FIG. 4 is a graph outlining the expected solution time as a function of risk for an allocation between two independent solution procedures with identical discrete bimodal distributions.
Figure 11:
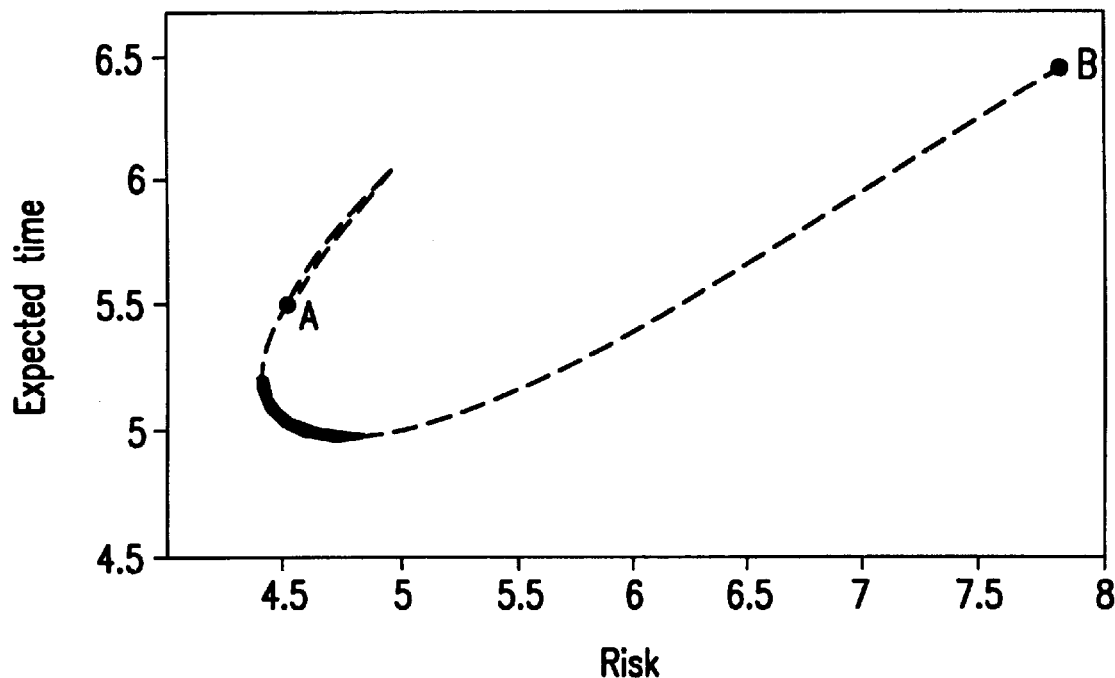
FIG. 11 is a graph outlining the expected transition completion time versus risk as a function of the priority allocation between two messages.

Specifically, the curve shown in FIG. 11 was determined in the same way as the curve shown in FIG. 4 was determined from the discreet equations described above, Eqs. (2)–(4) but rewritten for continuous rather than discreet variables, as shown in Eqs. (18)–(19):

$$G(t) = Prob[>t] = \left(\int_t^\infty dt' p_1(t')\right)\left(\int_t^\infty dt' p_2(t')\right); \text{ and} \quad (18)$$

-continued $$P(t) = -\frac{dG}{dt} = p_1(t)\int_t^\infty dt' p_2(t') + p_2(t)\int_t^\infty dt' p_1(t'), \quad (19)$$

where:

$t_1$ and $t_2$ are random variables;

$p_1(t)$ and $p_2(t)$ are the continuous probability density functions of the random variables $t_1$ and $t_2$, respectively;

P(t) is the probability density function for the random variable $t=\min[t_1,t_2]$;

and

G(t) is a distribution function as the probability of the random variable being greater than some t.

That is, G(t) is simply the probability that both $t_1$ and $t_2$ are greater than t.

Additionally, for a random variable $t'=t/k$, where k is a constant, the probability density function p'(t) is:

$$p'(t) = kp(kt) \quad (20)$$

Then, combining Eqs. (19) and (20) provides the probability density function of P(t) for the random variable t:

$$P(t) = f_1 f_2 \{ p_1(f_1 t)\int_t^\infty dt' p_2(f_2 t') + p_2(f_2 t)\int_t^\infty dt' p_1(f_1 t') \}. \quad (21)$$

As described above with respect to FIG. 4, the curves shown in FIG. 11 also has an efficient frontier, again indicated by the solid segment. As described above, the efficient frontier corresponds to the set of points for which, for every point not on the efficient frontier, there is at least one point on the efficient frontier that is always preferable, in that it has a lower risk as well as a faster expected completion time. In particular, the end point A which corresponds to sending a single message at the higher priority, is not on the efficient frontier, and therefore would never be preferred.

Figure 12:
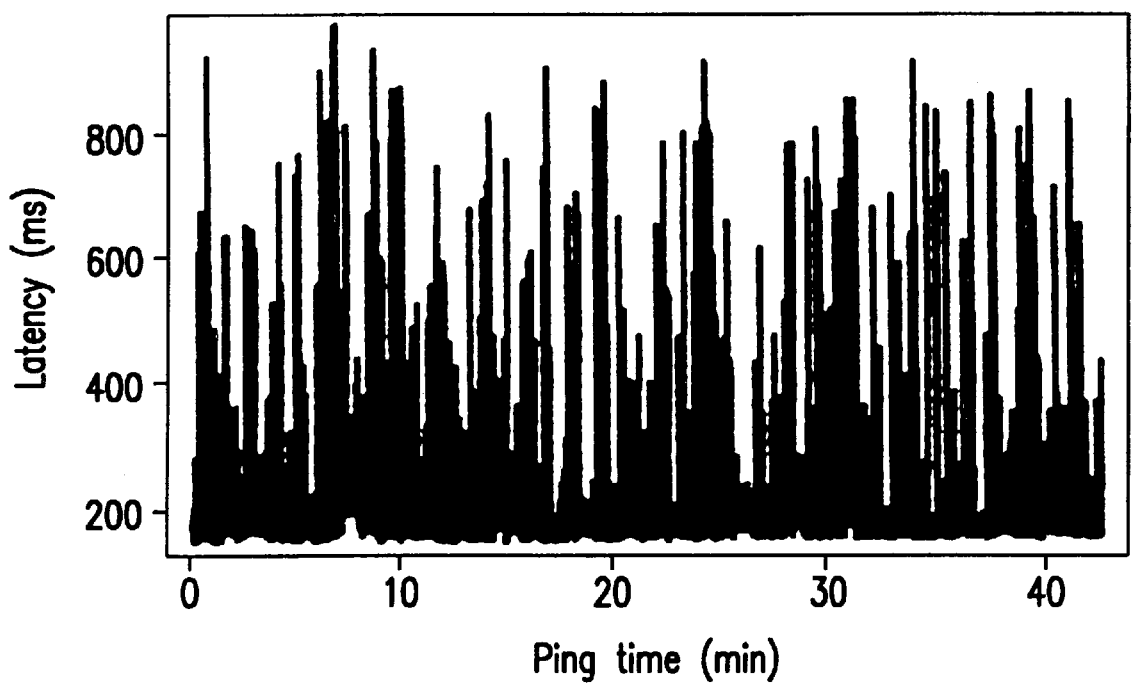
FIG. 12 is a graph outlining the latency of a time series of ICMP ping packets sent between two Internet sites.
Figure 13:
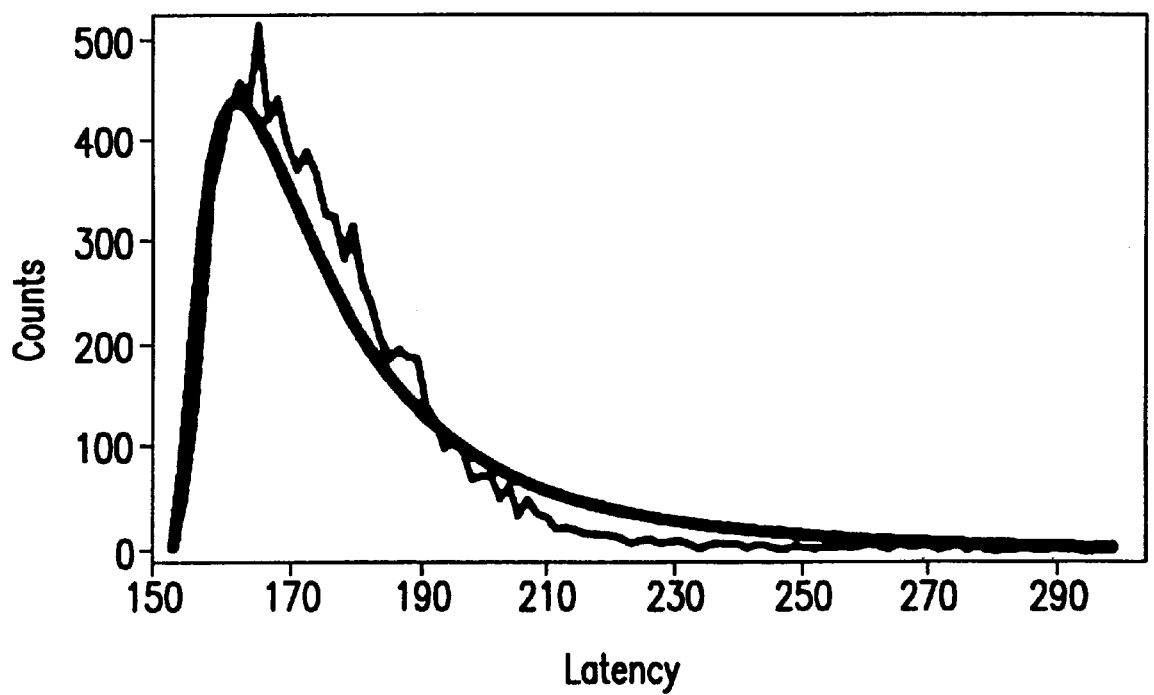
FIG. 13 is a histogram of the sampled ping latencies and a corresponding lognormal distribution.

Because, as shown in FIGS. 12 and 13, the distributed network known as the Internet has a well defined probability distribution, it is possible to design a particular efficient portfolio of mixed strategies for transmitting messages on the Internet and for downloading web pages from the Internet. In particular, as shown in FIG. 12, the round-trip times for 10,000 Internet control message protocol (ICMP) ping packets were measured. These 10,000 ping packets were sent from a public work station at Stanford University in California to a World Wide Web server in the United Kingdom over the course of about 45 minutes. In particular, each ping was sent 25 ms after the previous ping was returned. As shown in FIG. 12, the mean latency of the sample series is 189 ms. Thus, FIG. 12 shows a high frequency measure of the congestion on the Internet over a 45 minute period. These ping packets are almost exactly analogous to the fixed-sized transaction messages discussed above. It should be appreciated that of the 10,000 ping packets, 179 of them were never returned, and were removed from the series.

FIG. 13 shows a histogram of the transmission times of the 10,000 ping packets. In addition, FIG. 13 also shows a lognormal distribution having the same mean and variance values as that shown in FIG. 4. This lognormal distribution is superimposed over the transmission time histogram. In particular, the ping packet time histogram is shown using the fine line while the lognormal distribution is shown with the thick line. As shown in FIG. 13, the ping packet histogram has a generally lognormal distribution. This lognormal distribution reflects the dynamics of millions of users on the Internet confronted with the dilemma of either consuming bandwidth greedily and thus creating congestion, or postponing access to remote information and paying the corresponding cost in decreased utility. In particular, these empirical findings justify the use of a lognormal distribution in the restart strategy outlined above.

The Internet is rapidly becoming the medium through which a large share of communications and commerce will take place. While it is still too early to tell which elements of commerce will be dominated by the existence of the Internet, stock and commodities transactions are increasingly being consummated over the Internet, with or without the intervention of brokers and other intermediaries. Obviously, prompt receipt of buy and sell orders is imperative in this environment. Otherwise, the transaction delays will lead to significant losses. Accordingly, continued acceptance of using the Internet to consummate stock and commodities transactions hinges on having sufficient bandwidth and tolerable transaction latencies. Another increasing use of the Internet is private e-mail delivery systems that guarantee, in exchange for a fee, delivery of important data sets and the mail. In either case, the portfolio allocation method and system of this invention allow users to obtain increases performance and reduced risk over strategies using a single message.

While the portfolio allocation method and system of this invention have been described above relative to allocating computer resources to solving computationally hard problems, determine optimal restart strategies, and determining optimal allocation of usage costs associated with using a distributed network, the portfolio allocation method and system of this invention can be used to allocate other scarce computational resources.

In particular, memory and on-screen real estate available to a web page or an application are often scarce resources. Cache management and advertising space allocation within a web page are two important applications of this problem. Traditionally, cache management policies for a cache memory are based on standard deterministic algorithms that resort to least recently used (LRU) criteria to delete and replace information in the cache. This approach is problematic, in that it does not take into account either the value of the information stored or a particular user's needs, both of which can vary on a very short time basis. The portfolio allocation method and system of this invention can be used as a cache management tool to efficiently allocate space within the cache, or as a display management tool to efficiently allocate screen space to those resources that provide the most gain to the user, while updating the probability distributions by analyzing the user's use of the elements, such as files, stored in the memory or the elements, such as icons, displayed on the screen.

For example, display bookmarks often exceed the space available to display all of the desired bookmarks. Inherently, those bookmarks that are most often accessed by a user need to be presented. However, a problem arises in determining how to deal with those bookmarks that are seldom used. The portfolio allocation method and system of this invention can be used to allocate screen space to a mixture of both often-used and seldom-used bookmarks. Furthermore, the amount of space allocated to each type of bookmark can be easily determined from gathered statistics on the user's use of the various bookmarks.

Thus, the portfolio allocation method and system of this invention can be used to determine the amount of computational resources such as screen space or memory to be allocated between two types of information goods, type A and type B, where each type, A and B, is represented by a different icon. In particular, the type A icons are accessed $n_a$ times in a given time interval with a standard deviation, or risk, denoted as $\alpha_a$. Similarly, the type B icons are accessed in the same interval a number $n_b$ times and have an associated risk of $\alpha_b$. Thus, $f_a$ and $f_b$ are the fractional amounts of total screen space that is respectively allocated into displaying the type A icons and type B icons, or memory space that is allocated for storing the information goods associated with the type A icons and the type B icons, where $f_a+f_b=1$. Then, the total expected number of accesses in the given time interval will be the weighted average of the expected number of accesses n for each type of information good:

$$n=f_a n_a + f_b n_b, \qquad (22)$$

The total risk $\sigma$ associated with this portfolio of information goods is thus a function of the variances associated with each type of information good, weighted by the fractional allocations:

$$\sigma=[f_a^2\sigma_a^2+f_b^2\sigma_2^2 2 f_a f_b \sigma_a \sigma_b p]^{0.5}, \qquad (23)$$

where:

p is the corelational coefficient indicating how the access pattern of one information good is related to the other information good.

In particular, the last term of Eq. (23) indicates the covariance between the two types of icons or information goods.

In this case, plotting the overall expected number of accesses n as a function of the risk $\sigma$, where $\sigma_a$ is equal to 1, $\sigma_b$ is equal to 2 and p is equal to 0, results in the same curve as shown in FIG. 3.

Thus, when allocating space on a web page to icons representing various information goods, statistics can be collected on the frequency with which the various icons are accessed over a given time interval. Then, from the collected statistics, the expected value and variance for each icon can be estimated. From the estimated expected values and variances for the various icons, the curve shown in FIGS. 3 or 4 can be constructed. Then, by inverting the equations that generate the curve and selecting a particular risk value, a fractional allocation which optimally allocates screen space can be determined. Additionally, this allocation can be made dynamic, by continuing to collect statistics on the access frequencies of the various icons and continually updating the expected values and variances for each icon. After the expected values and variances are updated, the curve can be reconstructed and a new optimal fractional allocation can be determined.

Similarly, a cache can be managed by collecting statistics on the frequency with which each of the elements stored in the cache are accessed over a given time interval, instead of collecting statistics on the frequency with which various screen icons are accessed.

Figure 14:
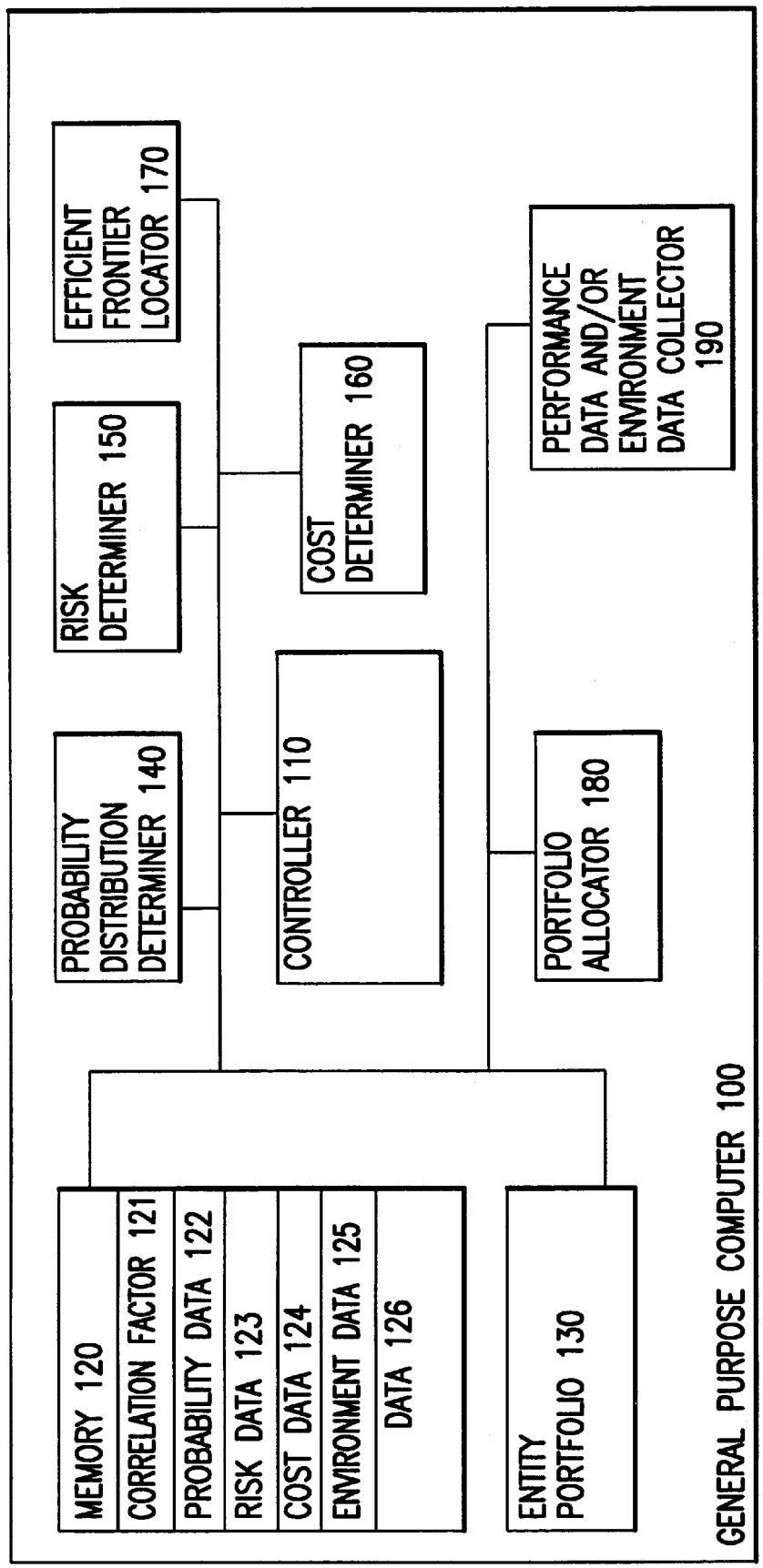
FIG. 14 is a block diagram of a resource allocation system according to this invention.

FIG. 14 shows one embodiment of a general purpose computer 100 implementing the method for allocating resources according to this invention. As shown in FIG. 14, the general purpose computer 100 includes a controller 110, a memory 120, an entity portfolio 130, a probability distribution determiner 140, a risk determiner 150, a cost determiner 160, an efficient frontier locator 170, a portfolio allocator 180, and a performance data and/or environment data collector 190. These elements are interconnected in the general purpose computer as shown. It should be appreciated that not all of these elements are required to implement the resource allocation method of this invention. In particular, depending upon the particular resource being allocated, the particular entities between which the resource is being allocated, and the particular performance factor being optimized, it may not be necessary to implement the cost determiner 160, the efficient frontier locator 170, or the performance data and/or environment data collector 190.

In particular, the entity portfolio 130 can comprise a plurality of processes executable on the general purpose computer 100, such as various solution procedures for solving a computationally hard problem. Alternatively, the entities stored in the entity portfolio 130 could be files to be stored in the memory 120, display entities, such as screen icons, to be displayed on a display screen of a display connected to the general purpose computer 100, or messages to be sent from the general purpose computer 100 to a remote computer over a distributed network.

It should also be appreciated that the probability distribution determiner 140, the risk determiner 150, the cost determiner 160, the efficient frontier locator 170, the portfolio allocator 180, and the performance data and/or environment data collector 190 can be implemented as software routines executing on the controller 110 and stored in the memory 120.

The memory 120, in addition to storing the various processes executing on the controller 110, includes a number of memory portions 121–126. In particular, the memory 120 includes a correlation factor memory portion 121, a probability data memory portion 122, a risk data memory portion 123, a cost data memory portion 124, an environment data memory portion 125, and a resource data memory portion 126. Similar to the discussion outlined above, the memory 120 may not include a number of these memory portions, such as the cost data memory 124 or the environment data memory portion 125 if these portions are not needed based on the particular entity, resource or performance factor.

In operations, a number of entities, such as different solution procedures for solving a computationally hard problem or different copies of a message to be sent over a distributed network, or different entities to be displayed upon the display screen are selected as elements of the entity portfolio 130. Once the entities forming the entity portfolio 130 are defined, probability data corresponding to the selected entities stored in the probability data storage portion 122 is provided to the probability distribution determiner 140. The probability distribution determiner determines a probability distribution function for each entity of the entity portfolio 130 for each performance factor to be optimized. Generally, only one performance factor will be optimized. However, it is possible that a number of performance factors could be optimized as a group. Then, once the probability distribution determiner 140 determines the probability distributions for each performance factor for each entity of the entity portfolio 130, the risk determiner 150 determines the risk associated with those performance factors. The risks are then stored to the risk data storage portion 123. If necessary, the cost determiner 160 then determines costs associated with each point on the risk/performance curve. Similarly, if necessary, the efficient frontier locator 170 determines the points on the risk/performance curve that form the efficient frontier.

The portfolio allocator 180 then inputs the probability distribution functions determined by the probability distribution determiner 140 and the risk data determined by the risk determiner 150, and possibly the cost data determined by the cost determiner 160 and the points defining the efficient frontier located by the efficient frontier locator 170, to allocate a selected resource between the entities of the entity portfolio 130. For example, the portfolio allocator may allocate processing time when the entity portfolio 130 stores processing entities, priority levels between different copies of a message, a pendency period that defines how long a message will be allowed to be pending, an amount of memory or display screen space when the entities of the entity portfolio are files to be stored or display entities to be displayed, or the like.

If appropriate, the performance data and/or environment data collector 190 collects performance and/or environment data which can be used to update the probability data, the risk data, the cost data and/or the environment data stored in the storage memory portions 122–125. When any one of these data sets is updated, the controller 110 controls the probability distribution determiner 140, the risk determiner 150, the cost determiner 160, and/or the efficient frontier locator 170 to generate new data for the portfolio allocator 180. The portfolio allocator 180 then dynamically reallocates the resource between the entities forming the entity portfolio 130 based on the collected data.

As shown in FIG. 14, the resource allocation system is preferably implemented on a programmed general purpose computer 100. However, the resource allocator system can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIG. 15 can be used to implement the resource allocation system.

Figure 15:
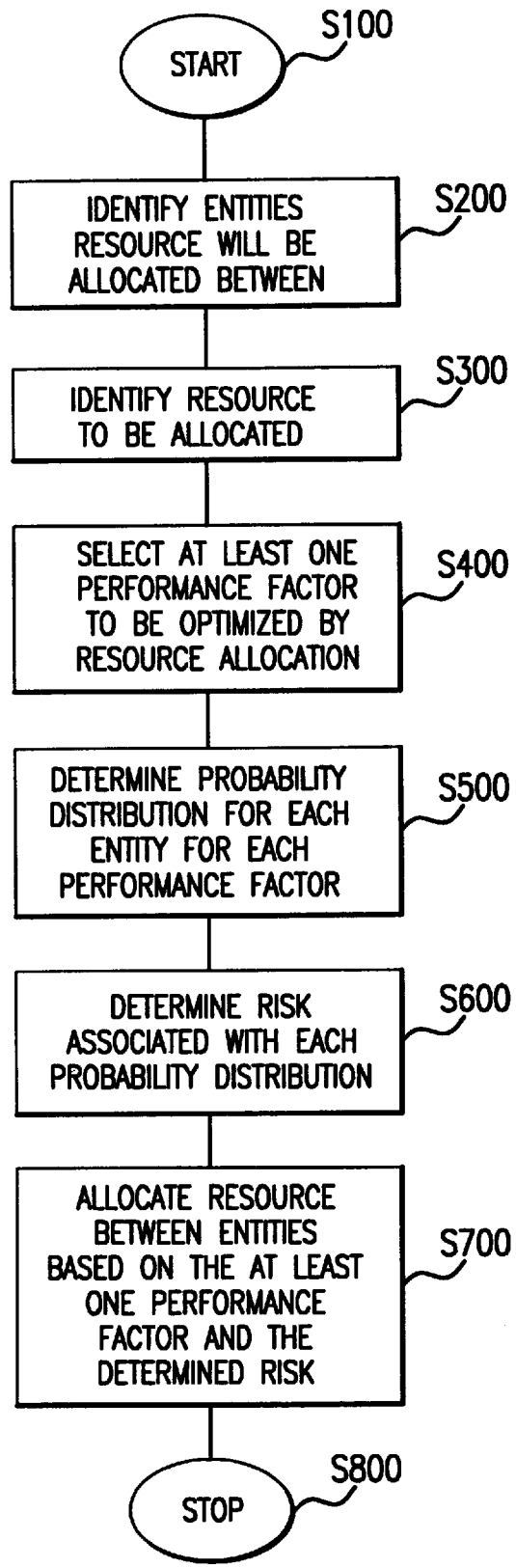
FIG. 15 is a flow chart outlining one embodiment of the method for allocating resources between entities according to this invention.

FIG. 15 is a flowchart outlining one embodiment of the resource allocation method of this invention. Starting in step S 100, control continues to step S200, where the entities are identified between which the particular resource will be allocated. As described above, these entities can be different processes executing on a general purpose computer, such as different solution procedures for solving a computationally hard problem or the like. Alternatively, the entities can be messages to be sent over a distributed network, files to be stored in a memory device having a limited storage space, display entities to be displayed on a display screen, or any other entity whose performance can be defined as a function of a limited computational resource, such as those outlined above.

Then, in step S300, the particular resource to be allocated among the identified entities is itself identified. As discussed above, this resource can be any limited computational resource that affects the performance of the identified entities. For example, when the entities are processes executing on a general purpose computer, the resource is processor time. When the entities are messages sent over a distributed network, the resource can be a number of entities to be sent, priority to be assigned to the various messages, total cost to be expended in sending the messages or the like. When the entities are files, the resource can be storage space. When the entities are display entities to be displayed on a display screen of a display device, the resource can be available screen real estate.

Next, in step S400, at least one performance factor is selected that will be optimized by the resource allocation of the resource between the identified entities. In particular, the performance factor can be minimum solution time or minimum solution risk when the entities are solution procedures for solving a computationally hard problem. Alternatively, the performance factor can be the likelihood of storage when the entities are files to be stored in a limited storage medium, or the likelihood of being displayed if the entities are screen entities to be displayed on a display screen of a display device.

Once the performance factor or factors have been selected in step S400, control continues to step S500. In step S500, a probability distribution is determined for each entity for each selected performance factor. Then, in step S600, a risk associated with each probability distribution determined in step S500 is determined. Next, in step S700, the resource identified in step S300 is allocated between the entities identified in step S200 based on the performance factor or factors and the determined risk. Control then continues to step S800, where the process stops.

It should be appreciated that the process shown in FIG. 15 can be modified by inserting, between steps S700 and S800, a feedback loop which returns to step S500. In this feedback loop, performance and/or environmental data can be collected and used to refine the determined probability distributions and/or risks associated with the probability distribution as additional information is gained about the entities and/or additional information is gained about the environment in which the identified entities are operating. Based on the updated probability distributions and/or risks, the allocation of resources between the various identified entities can be updated based on the selected performance factor or factors.

It should also be appreciated that, in steps S200–S400, a user generally identifies or selects the entities between which the particular resource will be allocated, the particular resource to be allocated among the identified or selected entities, and the performance factor or factors that will be optimized by the resource allocation of the resource between the identified or selected entities. Then, once the entities, the resource and the performance factor(s) have been identified, the subsequent steps are preferably performed by a suitably programmed general purpose computer or the like, as outlined above. However, it should further be appreciated that the entities, the resource and/or the performance factor(s) can be completely or partially identified or selected by the suitably programmed general purpose computer or the like.

For example, the entities can be different instances of a single solution procedure, where the different instances are distinguished by using different random starting positions. In this case, after the user identifies the solution procedure, the specific different instances forming the portfolio can be selected by the suitably programmed general purpose computer or the like.

While this invention has been described in conjunction with the specific embodiments outlined above, it is evident that many alternatives, modifications and variations will be apparent to those skilled in the art. Accordingly, the embodiments of the invention set forth above are intended to be illustrative, not limiting. Various changes may be made without departing from the spirit and scope of the invention as defined in the following claims.

What is claimed is:

1. A method for allocating at least one resource between a plurality of entities of an information system, comprising:

selecting at least one performance factor for the plurality of entities;

determining a probability distribution of the at least one performance factor for the plurality of entities;

determining a risk associated with each of the plurality of probability distributions; and allocating the at least one resource between the plurality of entities based on the plurality of risks.

2. The method of claim 1, wherein:

the information system is a computer comprising a processor and a memory;

the plurality of entities is a plurality of solution procedures for solving a computationally hard problem; and the at least one resource is processing time of the processor.

3. The method of claim 2, wherein the performance factor is minimum time to obtain a solution to the computationally hard problem.

4. The method of claim 2, wherein the performance factor is minimum total risk associated with the plurality of solution procedures.

5. The method of claim 2, wherein the plurality of solution procedures comprises a plurality of different solution procedures.

6. The method of claim 2, wherein the plurality of solution procedures comprises a plurality of different instances of a single solution procedure.

7. The method of claim 1, wherein:

the information system is a distributed network connecting a plurality of computers;

the plurality of entities is a plurality of messages sent from a first one of the plurality of computers to a second one of the plurality of computers; and the at least one performance factor is time to receive a response to the plurality of messages from the second computer at the first computer.

8. The method of claim 7, wherein the plurality of messages is a plurality of copies of a single message.

9. The method of claim 7, wherein:

the plurality of messages sent from the first one of the plurality of computers to the second one of the plurality of computers can be pending at the same time; and the resource to be allocated is number of messages to be sent.

10. The method of claim 7, wherein:

only one of the plurality of messages sent from the first one of the plurality of computers to the second one of the plurality of computers can be pending at any one time; and the resource to be allocated is delay between cancelling a pending one of the plurality of messages and sending another of the plurality of messages.

11. The method of claim 7, wherein:

the plurality of messages can be sent from the first one of the plurality of computers to the second one of the plurality of computers can be pending at the same time; and the resource to be allocated is a priority of each of the plurality of messages.

12. The method of claim 1, wherein each different priority has a different price, and the priorities of the plurality of messages are further allocated to obtain a desired total cost.

13. The method of claim 11, wherein each different priority has a different price, and the priorities of the plurality of messages are further allocated to obtain a cost equal to sending a single message at a highest priority.

14. The method of claim 1, wherein:

the information system is a computer comprising a processor and a memory;

the plurality of entities is a plurality of files to be stored in the memory, a total size of the plurality of files exceeding a size of the memory; and the at least one performance factor is likelihood that a desired file is stored in the memory.

15. The method of claim 14, wherein:

the resource to be allocated is space in the memory for storing the files.

16. The method of claim 1, wherein:

the information system is a computer comprising a processor and a display device, the display device having a display screen having an area;

the plurality of entities is a plurality of display entities to be displayed on the screen of the display device, a total amount of area consumed by the entities being greater than an area of the screen provided for the plurality of display entities; and the at least one performance factor is likelihood that a desired display entity is displayed on the screen of the display device.

17. The method of claim 16, wherein:

the resource to be allocated the area of the screen provided for displaying the plurality of display entities.

18. A method for efficiently solving a computationally hard problem on a computer comprising a processor and a memory, the method comprising:

selecting a plurality of different computer-implemented solution procedures for solving the computationally hard problem;

selecting at least one performance factor of the computationally hard problem to be optimized;

determining a probability distribution for each at least one performance factor for each of the plurality of solution procedures;

determining a risk associated with each of the plurality of probability distributions; and allocating at least one computational resource between the plurality of solution procedures based on the plurality of risks.

19. The method of claim 18, wherein the at least one computational resource is processing time of the processor.

20. The method of claim 18, wherein the performance factor is minimum time to obtain a solution to the computationally hard problem.

21. The method of claim 18, wherein the performance factor is minimum total risk associated with the plurality of solution procedures.

22. The method of claim 18, wherein the plurality of solution procedures comprises a plurality of different solution procedures.

23. The method of claim 18, wherein the plurality of solution procedures comprises a plurality of different instances of a single solution procedure.

24. A method for efficiently allocating at least one computational resource between a plurality of processes executing on a computer comprising a processor and a memory, comprising:

selecting at least one performance factor for the plurality of processes;

determining a probability distribution of the at least one performance factor for the plurality of processes;

determining a risk associated with each of the plurality of probability distributions; and allocating the at least one computational resource between the plurality of processes based on the plurality of risks.

* * * * *